US008503994B1

United States Patent
Sanjeev (10) Patent No.: US 8,503,994 B1
(45) Date of Patent: Aug. 6, 2013

(54) AUTOMATED REPLY TO INCOMING COMMUNICATIONS WHILE IN MOTION

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/188,991

(22) Filed: Jul. 22, 2011

(51) Int. Cl.
*H04M 3/42* (2006.01)

(52) U.S. Cl.
USPC ........ 455/414.1; 455/466; 455/418; 455/419; 455/420; 455/456.1; 455/456.4; 455/421; 455/415; 455/417; 455/404.2

(58) Field of Classification Search
USPC .............. 455/414.1, 466, 418, 419, 420, 421, 455/415, 417, 404.2, 456.1, 456.4
See application file for complete search history.

(56) References Cited

U.S. PATENT DOCUMENTS

| | | | |
|---|---|---|---|
| 2008/0099563 A1* | 5/2008 | Wormald et al. | ........ 235/472.01 |
| 2008/0268882 A1 | 10/2008 | Moloney | |
| 2009/0221279 A1* | 9/2009 | Rutledge | ........................ 455/418 |
| 2010/0216509 A1* | 8/2010 | Riemer et al. | ................ 455/557 |
| 2011/0117903 A1 | 5/2011 | Bradley | |
| 2011/0151842 A1* | 6/2011 | Olincy et al. | .............. 455/414.1 |

OTHER PUBLICATIONS

Cazanas, Carlos A. et al. U.S. Appl. No. 12/787,997, filed May 26, 2010, entitled "Systems and Methods for Automating a Response from a Mobile Station."
Maxis—Personal—Terms and Conditions. The Maxis Message Plus SMS Services. URL http://www.maxis.com.my/personal/general/tnc_MessagePlus.asp, site accessed Mar. 11, 2009.

* cited by examiner

*Primary Examiner* — Patrick Edouard
*Assistant Examiner* — Shantell L Heiber (57) ABSTRACT

An automated reply system may automatically reply to incoming communications to wireless mobile communication devices while the devices are moving in conformance with one or more predetermined criteria, such as moving faster than a threshold speed. A communication module may receive auto reply settings, including an auto reply setting indicative of whether automated replies should be sent in response to incoming communications to each device while it is moving in conformance with the criteria. A security module may permit who can change the auto reply settings for each device to be restricted to a person that is not a primary user of the device. An auto reply module may automatically provide a reply communication to each incoming communication to each device that have been set to automatically reply, only while the device is moving in conformance with the criteria.

18 Claims, 4 Drawing Sheets

AUTOMATED REPLY TO INCOMING COMMUNICATIONS WHILE IN MOTION

BACKGROUND

1. Technical Field

This disclosure relates to the management of incoming wireless communications, such as incoming instant messages and phone calls, while traveling in a vehicle.

2. Description of Related Art

The receipt of wireless communications, such as instant messages and phone calls, by a driver of a vehicle can be distracting. The situation can become dangerous, especially if the driver attempts to respond while driving. Teenagers can be especially prone to these dangers.

To address this problem, efforts have been made to automatically reply to incoming communications while driving, such as are described in U.S. patent application Ser. No. 12/787,997, entitled "Systems and Methods for Automating a Response From a Mobile Station," filed May 26, 2010, and assigned to the assignee of this application. Such efforts, however, generally require a custom application to be installed in the wireless mobile communication device. This can add costs and complexities to the operation of the device. The protections that such applications provide can also be deactivated by the user of the device, such as the teenagers that the applications are intended to protect.

SUMMARY

Automated replies may be sent to incoming communications to wireless mobile communication devices while the devices are moving in conformance with one or more predetermined criteria, such as faster than a threshold speed. No special software must be installed in the wireless mobile communication devices, and the persons they are intended to protect may be unable to deactivate the automated function.

A communication module may receive auto reply settings, including an auto reply setting indicative of whether automated replies should be sent in response to incoming communications to each of the wireless mobile communication devices while each device is moving in conformance with one or more predetermined criteria. A security module may permit who can change the auto reply settings for each wireless mobile communication device to be restricted to a person that is not a primary user of the wireless mobile communication device. An auto reply module may automatically provide a reply communication to each incoming communication to each wireless mobile communication device for which an automatic reply has been established, only while the wireless mobile communication device is moving in conformance with the one or more predetermined criteria.

A communication deferral module may defer the delivery of incoming communications to which replies have automatically been provided until the wireless mobile communication device to which the communications were sent is no longer moving in conformance with the one or more predetermined criteria. The auto reply settings for each wireless mobile communication device may include a deferral setting indicating whether the delivery of incoming messages should be deferred while the wireless mobile communication device is moving in conformance with the one or more predetermined criteria. The communication deferral module may defer the delivery of an incoming communication when dictated by one of the deferral settings. The security module may permit who can change the deferral setting for each wireless mobile communication device to be restricted to a person that is not a primary user of the wireless mobile communication device.

The auto reply settings may include a no-reply setting for each wireless mobile communication device identifying senders to whom reply communications should not automatically be sent, even when the settings indicate that auto replies should normally be sent and the wireless mobile communication device is moving in conformance with the one or more predetermined criteria at the time of the communication. The auto reply module may not automatically provide a reply to an incoming communication when dictated by one of the no-reply settings. The security module may permit who can change the no-reply setting for each wireless mobile communication device to be restricted a person that is not a primary user of the wireless mobile communication device.

The predetermined criteria for initiating the automated reply may include when the wireless mobile communication device is moving in excess of a first predetermined speed, and the predetermined criteria for ending the automated reply may include when the wireless mobile communication device is no longer moving in excess of a second predetermined speed that is lower than the first predetermined speed.

The predetermined criteria for initiating the automated reply may include when the wireless mobile communication device is moving in excess of a predetermined speed and the predetermined criteria for ending the automated reply may include when the wireless mobile communication device is no longer moving in excess of a predetermined speed for a predetermined period of time.

The security module may authenticate each person who is authorized to change the auto reply settings for each wireless mobile communication device before accepting any change to the auto reply setting from the person.

The communication module may include a web interface configured to receive the auto reply settings.

The communication module may allow the content of each reply communication that is automatically sent to be specified. The specification may be made by making a selection.

The auto reply module may receive incoming communications in the form of instant messages and send replies to them in the form of instant messages. The auto reply module may receive incoming communications in the form of phone calls and send replies to them in the form of voice messages.

The auto reply settings for each wireless mobile communication device may include settings indicative of which types of communications should receive automated replies.

The automated reply system may only manage communications to a single wireless mobile communication device and may by part of the wireless mobile communication device.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
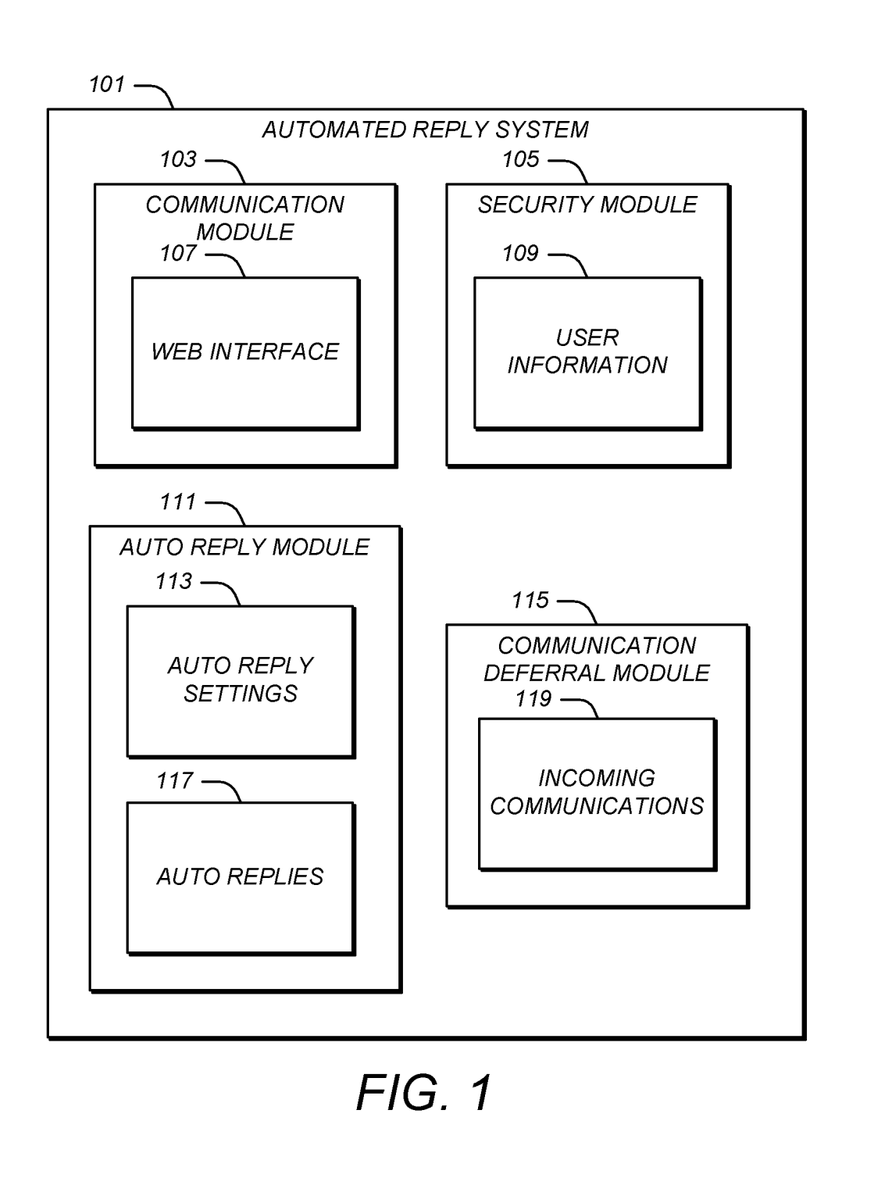
FIG. 1 illustrates an automated reply system that automatically replies to incoming communications to wireless mobile communication devices while the wireless mobile communication devices are moving in conformance with one or more predetermined criteria.

FIG. 1 illustrates an automated reply system 101 that automatically replies to incoming communications to wireless mobile communication devices while the wireless mobile communication devices are moving faster than a threshold speed.

The automated reply system 101 may be a server-based computer system that is part of a network communication system, such as a cellular communication network and/or the Internet.

The wireless mobile communication devices may be of any type. For example, they may be cell phones, smart phones, laptop computers, PDA's, tablet computers, or any combination of these.

As illustrated in FIG. 1, the automated reply system 101 includes a communication module 103, a security module 105, an auto reply module 111, and a communication deferral module 115. These modules may be in a single server or distributed among different servers. The single or multiple servers may be part of the Internet, a cellular communication system, and/or a different type of network.

The communication module 103 is configured to receive auto reply settings. This includes an auto reply setting for each wireless mobile communication device that indicates whether an automated reply should be sent in response to incoming communications to the wireless mobile communication device while it is moving in conformance with the one or more predetermined criteria, such as faster than a threshold speed.

The threshold speed for each wireless mobile communication device may be in any amount and in any units. For example, the threshold speed may be indicative of the wireless mobile communication device traveling in a moving vehicle. Thus, for example, the threshold speed may be 5, 10, 15, 20 or another number of miles per hour or in a similar amount expressed on other units. The threshold speed may be high enough to avoid triggering an automated reply merely when the wireless mobile communication device is being carried by someone walking on foot. Thus, the threshold speed may be greater than 3, 5, 10, or another number of miles per hour. The threshold speed may be set above the typical speed of a bicycle (e.g., 20 mph) or roller skates (e.g., 10 mph) or between a typical speed of walking and a typical speed of a bicycle and/or roller skates. The threshold speed may instead be set to a speed that is typical of a vehicle traveling on a high speed road, such as a freeway. In this case, the threshold speed may be 40, 50, 60 or another number of miles per hour. The threshold speed may be preset in the software. The setting may or may not be user-configurable. When user configurable, the interface may permit the user to specify a specific speed and/or select from a list. When a list is presented, the list may specify specific speeds, speed levels (e.g., Low, Med, or High) or types of driving (e.g., City or Highway).

Figure 2:
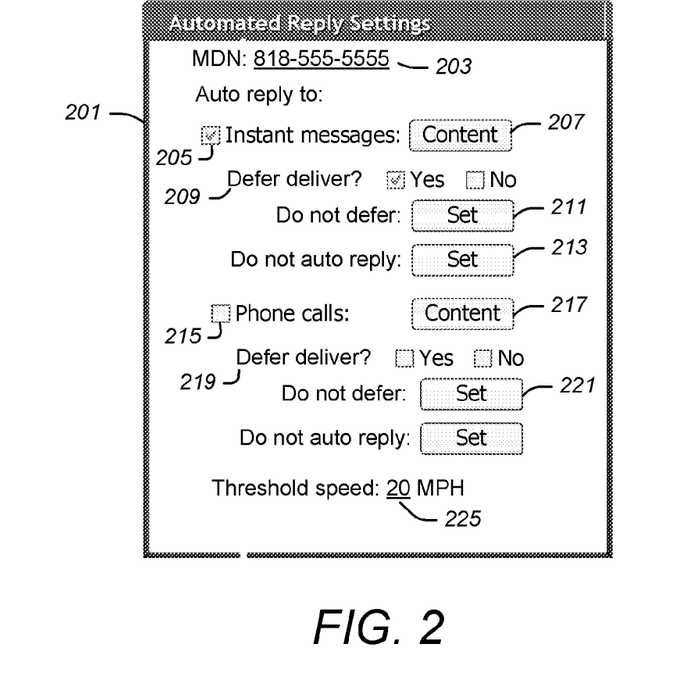
FIG. 2 illustrates a dialog box that may be presented that allows a person to set various auto reply settings.

FIG. 2 illustrates a dialog box 201 that may be presented that allows a person to set various auto reply settings.

The communication module 103 may be configured to cause the dialogue box 201 to be presented through a web interface 107. This may allow the auto reply settings to be specified by a computer connected to the Internet through the web interface 107 without using the wireless mobile communication device to which the settings apply. In addition or instead, the communication module 103 may be configured to cause the dialogue box 201 to appear on a display in the wireless mobile communication device to which the settings apply. The communication module 103 may be configured to allow the information in the dialogue box 201 to be entered in a different manner. For example, the communication module 103 may cause a series of dialog boxes to be presented that each asks for just a single user setting.

As illustrated in FIG. 2, the auto reply settings may specify a mobile device number (MDN) 203 for the wireless mobile communication device to which they pertain. This number may be supplied by the person providing the settings, or may be provided on an automated basis, based on an identification of that person and/or an account with which that person is associated. For example, a person may login using a user name and password, following which a lookup would be made in a database for the MDN that is associated with that account. In lieu of a phone number, an IP address or other form of wireless mobile communication device identification may be provided.

The auto reply settings for each wireless mobile communication device may include settings indicative of which types of communications should receive automated replies. As illustrated in FIG. 2, for example, the types may include instant messages 205 and phone calls 215. Emails and/or other types of communications may additionally or instead be included. The settings may in addition or instead specify that automated replies should only be sent to a specified list of senders. Various settings may be provided in connection with each type of communication. For example, the content of the reply message may be specified, such as by activating a Content button 207 in connection with instant messages or a Content button 217 in connection with phone calls.

Upon actuation of the Content button 207, a new dialogue box (not shown) may open that may contain a field in which the text of the auto reply may be inserted. The text may recite a personalized message. For example, in response to an instant message the text may recite: "I am sorry, you caught me driving. I will text you back as soon as I can." The dialogue box may in addition or instead allow one of a variety of different auto reply messages to be selected. A similar message, specific to the type of incoming communication, may be supplied in the response to an incoming email and/or phone call. Although the messages may be specific to the type of incoming communication as specified by the auto reply settings, in another communication a single generic message, such as "I am sorry, you caught me driving. I will get back to you as soon as I can," may be used for all incoming communications specified by the auto reply settings. The text of each different message may be provided as part of the software and/or specified by a user.

Upon actuation of the Content button 217, a voice recorder application may open and record a voice message that is to be automatically provided in reply. A dialogue box (not shown) may in addition or instead be provided for selecting one of several pre-voicemail messages, one or more of which may be provided with the software and/or supplied by a user.

Another reply setting in connection with each type of communication may specify whether delivery of the incoming communication is to be deferred until the wireless mobile communication device to which it is directed is no longer moving in conformance with the one or more predetermined criteria. This is reflected by a Defer Delivery? Yes/No setting 209 for instant messages and a Defer Delivery? Yes/No setting 219 for phone calls.

Even when deferred delivery of incoming communications has generally been specified, incoming communications from specified senders may nevertheless be delivered. This may be facilitated, for example, by identifying these senders in a dialogue box (not shown) that opens in response to actuation of a Set button 211 for instant messages and a Set button 221 for phone calls. The senders may be identified in any way in these dialogue boxes, such as by name, phone number, and/or IP address.

Notwithstanding that auto replies have generally been specified to be provided in connection with a particular type of incoming communication, the delivery of such auto replies may be suppressed in connection with certain specified senders by identifying them in a dialogue box (not shown) that may appear in response to actuation of a Set button 213 in connection with instant messages or a Set button 223 in connection with phone calls. Again, the senders may be identified in any way, such as in any of the ways described above.

The auto reply settings may include different or other types of settings, such as a setting 225 for the threshold speed above which auto replies should be sent. If present, the threshold speed setting may be global and applicable to all wireless mobile communication devices indicated by the wireless mobile communication device identifications provided in a particular set of auto reply settings or individual with a different setting for each wireless mobile communication device.

The security module 105 is configured to permit who can change the auto reply settings to be restricted for each wireless mobile communication device. Authorization may be restricted in connection with each wireless mobile communication device to a person that is not a primary user of the wireless mobile communication device. Thus, in one embodiment, only an individual who is associated with, but not a primary user of, a particular wireless mobile communication device is able to be authorized to create, modify, and/or delete auto reply settings for the particular wireless mobile communication device.

For example, a parent may purchase a wireless mobile communication device and subscribe to a wireless mobile communication service for their teenager. The security module 105 may be configured to only allow the parent or a duly authorized representative of the parent to make changes to the auto reply settings, such as to the types of communications to which auto replies should be sent, whether delivery of each type of communication should be deferred until the device is no longer moving in conformance with the one or more predetermined criteria, the identity of senders that should be exempted from deferred delivery, and/or the identity of senders to which no reply should be automatically provided. The security module 105 may be configured to allow a person to change the content of an automated reply that is different from the person who is authorized to change other auto reply settings, For example, the security module 105 may be configured to allow a primary user of the wireless mobile communication device to change the content of an automated reply, but not other auto reply settings.

The security module 105 may be configured to authenticate each person who is authorized to change the auto reply settings for each wireless mobile communication device before accepting any change to the auto reply settings from that person. Any form of authentication may be used, such as by requesting a user name/password, detecting the presence of a digital certificate, requesting the code on a token, and/or using a SSO (Single Sign-on) to login from a partner site. If authentication fails, the person may not be permitted to change the auto reply settings. The security module 105 may store user information 109 to facilitate this authentication. Examples of such user information 109 include name, email address, mobile number, and/or a security question(s) to retrieve a password. Any type of storage system may be used to store this information, such as one or more hard disk drives.

The security module may or may not permit the person who is authorized to change the reply settings to also permit them to be changed by a primary user of the associated wireless mobile communication device. For example, the security module may restrict the person who can make these changes to someone who enters a specific user name and password. That authorized person, in turn, may give this security information to a primary user of the wireless mobile communication device who may then use them to also make changes. On the other hand, the security module may require a specific fingerprint or other biometric information to be provided, in which case the required authorization to access the reply settings may not readily be given to a primary user of the device.

The various auto reply settings that have been provided may be stored in an auto reply settings storage system 113. Correspondingly, the content of the various auto replies that have been provided or selected may be stored in an auto replies storage system 117. These storage systems may be of any type, such as one or more hard disk drives.

Figure 3:
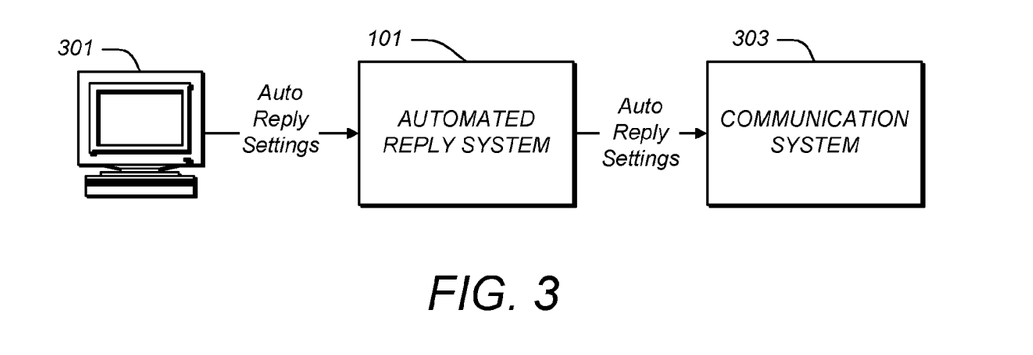
FIG. 3 illustrates routings of auto reply settings.

FIG. 3 illustrates routings of auto reply settings. As illustrated in FIG. 3, a computer system 301 is used to deliver auto reply settings to the auto reply module 111 in the automated reply system 101, which, as indicated above, are stored in the auto reply settings storage system 113. The computer system 301 may be of any type. For example, it may be a client PC delivering this information over the internet to the communication module 103 through the web interface 107. One or more or all of these auto reply settings, in turn, are delivered from the automated reply system 101 to a communication system 303 which may store the settings it receives. In connection with any setting that is stored in the communication system 303, there may be no need for its redundant storage in the auto reply settings storage system 113.

The communication system 303 is configured to receive incoming communications. When the incoming communications are instant messages, such as SMS or MMS messages, the communication system 303 may include an SMSC for processing the SMS messages and an MMSC for processing the MMS messages. When the communication system 303 is managing incoming phone calls, the communication system 303 may include a private branch exchange (PBX).

The communication system 303 may include a database of information about the wireless mobile communication devices that it manages. The database may include the phone number and/or IP addresses of the wireless mobile communication devices. The database may be configured to additionally store the auto reply settings for each wireless mobile communication device. The storage system may be of any type, such as one or more hard disk drives.

Figure 4:
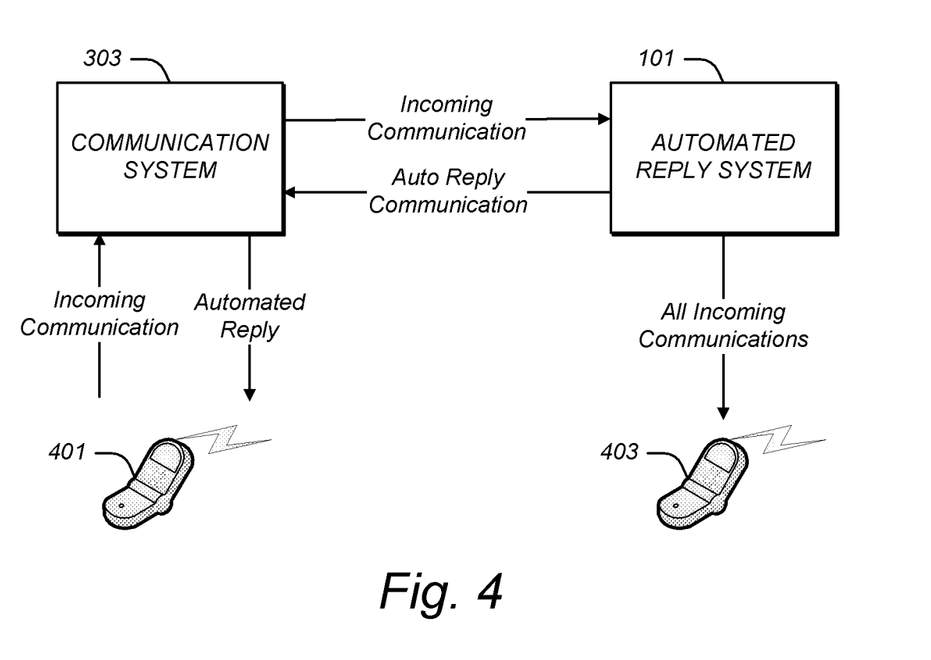
FIG. 4 illustrates routings of an incoming communication to a wireless mobile communication device that has been set for auto replies and deferred message delivery, and that is moving in conformance with the one or more predetermined criteria, and routings of an associated automated reply.
Figure 5:
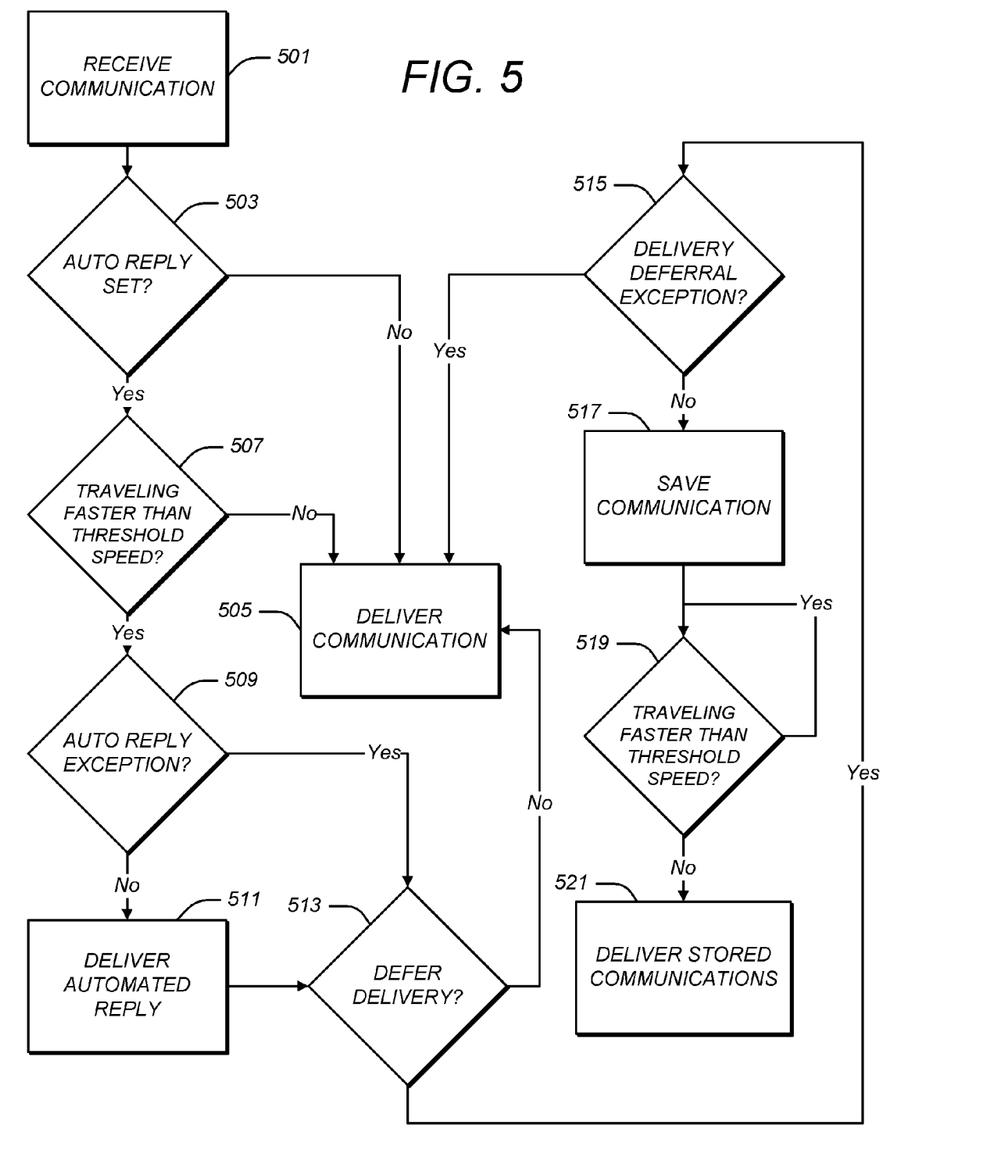
FIG. 5 illustrates a process for determining the routings of the incoming communication and the associated automated reply illustrated in FIG. 4.

FIG. 4 illustrates routings of an incoming communication to a wireless mobile communication device that has been set for auto replies and deferred message delivery, and that is moving faster than the threshold speed, and routings of an associated automated reply. FIG. 5 illustrates a process for determining the routings of the incoming communication and the associated automated reply illustrated in FIG. 4.

As illustrated in FIG. 4, an incoming communication originates from a communication device 401. Although illustrated as a cellphone, it may instead be any other type of communication device, such as a desktop PC or a telephone.

This communication is received by the communication system 303, as reflected by a Receive Communication step 501 in FIG. 5. The communication system 303 determines whether an automated reply is to be sent in response to the communication that it received, as reflected by an Auto Reply Set? decision step 503. During this step, the communication system 303 checks its database to determine the auto reply setting for the wireless mobile communication device 403 to which the communication is directed in connection with the particular type of the communication. If auto reply has not been set, the communication system 303 delivers the incoming communication to the wireless mobile communication device 403 in its normal manner, as reflected by a Deliver Communication step 505. If auto reply has been set, on the other hand, the communication system 303 determines whether the wireless mobile communication device 403 is moving faster than the threshold speed, as reflected by a Traveling Faster Than Threshold Speed? decision step 507.

The traveling speed of the wireless mobile communication device 403 may be determined by any means. For example, the communication system 303 may query the wireless mobile communication device 403 for information about GPS signals that the wireless mobile communication device 403 has been receiving. The communication system 303 may in addition or instead seek triangulation information from the cell sites that are in communication with the wireless mobile communication device 403. From this information, the communication system 303 determines the movement speed of the wireless mobile communication device 403. The communication system 303 may in addition or instead communicate with another system to obtain this speed information, such as If the wireless mobile communication device 403 is not determined to be traveling in excess of the threshold speed, the incoming communication is delivered in its normal manner to the wireless mobile communication device 403, as reflected by the Deliver Communication step 505.

If the wireless mobile communication device 403 is determined to be traveling faster than the threshold speed, on the other hand, the communication system 303 delivers the incoming communication to the automated reply system 101, as reflected in FIG. 4. The auto reply module 111 then checks to determine whether the communication is from a sender that has been exempted from receiving automated replies, as reflected by an Auto Reply Exception? decision step 509. If the sender has not been exempted, the auto reply module 111 looks up the auto reply that that should be sent for the type of incoming communication that was received in the auto replies storage system 117 and sends this back to the communication system 303, as illustrated in FIG. 4. The communication system 303 then sends the auto reply to the communication device 401. This entire sequence is illustrated as a Deliver Automated Reply step 511.

If the sender has been exempted from receiving auto replies, the automated reply is not sent.

The auto reply module 111 then determines whether delivery of the incoming message should be deferred, as reflected in a Defer Delivery? decision step 513. If not, the auto reply message delivers the incoming communication to the wireless mobile communication device 403, as reflected by the Deliver Communication step 505. The auto reply module 111 may cause the incoming communication to be delivered to the wireless mobile communication device 403 either directly by sending an SMS message or voicemail notification through an SMPP gateway or indirectly by sending an instruction to the communication system 303 to deliver it.

If the automated reply settings indicate that delivery should normally be deferred, on the other hand, the auto reply module 111 checks to see whether the particular sender is exempted from deferred delivery, as reflected by a Delivery Deferral Exemption decision step 515. If so, the auto reply module 111 causes the incoming communication to be delivered to the wireless mobile communication device 403, such as in any of the manners described above.

If the sender is not exempted, on the other hand, the auto reply module 111 delivers the incoming communication to the communication deferral module 115 which, in turn, stores it in an incoming communications storage system 119, as reflected by Save Communication step 517. The incoming communications storage system 119 may be of any type, such as one or more hard disk drives.

If the incoming communication is an instant message, the instant message, including its header information, is stored. If the incoming communication is a phone call, sender information may instead be stored. In either case, the time of the communication may also be stored.

Other incoming communications may be processed in the same way, and the incoming communications storage system 119 may accumulate several incoming communications (whether of the same or different types) for several of the wireless mobile communication devices.

The communication deferral module 115 continually checks each wireless mobile communication device for which it is storing an incoming message, such as the wireless mobile communication device 403, to determine if it is still traveling faster than the threshold speed, as reflected by a Traveling Faster Than Threshold Speed decision step 519. Once a wireless mobile communication device for which an incoming message is stored is determined not to be traveling faster than the threshold speed, the communication deferral module 115 causes these stored communications to be delivered to the associate wireless mobile communication device, as reflected by a Deliver Stored Communications step 521, and as also reflected in FIG. 4. The communication deferral module 115 may do so using any method, such as any of the methods discussed above in connection with the delivery of incoming communications by the auto reply module 111.

A threshold speed has thus far been discussed as the one or more movement criteria for determining when to automatically send and stop sending automated replies and when to defer the delivery of incoming message. However, this is only an example. In other configurations, the one or more predetermined criteria may include a speed for initiating automated replies and/or communication deferrals that is different than the speed for stopping automated replies/communication deferrals. For example, automated replies/communication deferrals may be initiated when one speed has been exceeded (e.g., 20 mph), but only stopped when a significantly lower speed (e.g., 5 mph) has been reached, thus providing a hysteresis to this functionality.

There may also be temporal component to the predetermined criteria. For example, the automated replies/communication deferrals may not be immediately terminated when the wireless mobile communication device is moving at below a threshold speed. Rather, they may continue until movement at below the threshold speed continues for more than a predetermined period, such as 5 or 10 minutes. Such a temporal component may prevent communications from being delivered while a vehicle is only temporarily stopped or slowed, such as at a red light or because of a temporary delay. The automated replies and communication deferrals in the same wireless mobile communication device may have different criteria associated therewith—e.g., different sets of threshold speeds, amounts of hysteresis, and/or temporal components, and may be individually established by different entities (e.g., a user or by the system). Similarly, the automated replies and communication deferrals in different wireless mobile communication devices may have different criteria associated therewith and may be individually established by different entities The various steps that have been described in connection with FIG. 5 may be performed by systems or modules different from those that have been described above, in a different order, and/or with additional or not as many steps. For example, the communication system 303 may itself be configured to perform one or more of the functions of the auto reply module 111 and/or the communication deferral module 115 that have been described above. Conversely, the auto reply module 111 and/or the communication deferral module 115 may be configured to perform one or more of the functions of the communication system 303 that have been described above.

Figure 6:
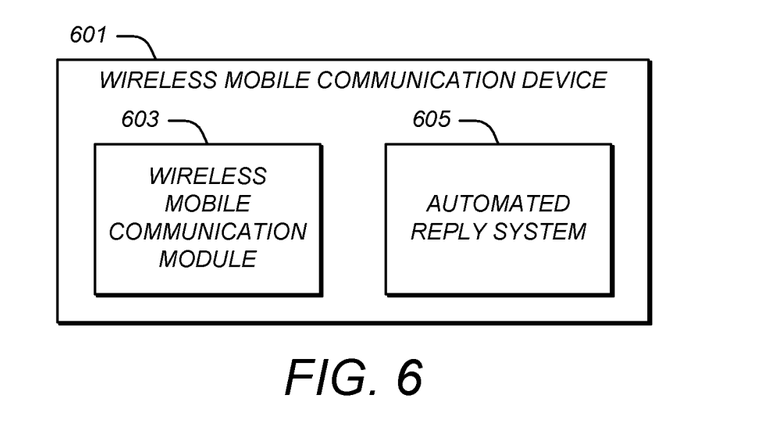
FIG. 6 illustrates an automated reply system that is part of a wireless mobile communication device that is controlled by the automated reply system.

FIG. 6 illustrates an automated reply system 605 that is part of a wireless mobile communication device 601 that is controlled by the automated reply system 605.

The wireless mobile communication device 601 may be any of the types discussed above. The wireless mobile communication device 601 includes a wireless mobile communication module 603. The wireless mobile communication module 603 is configured to communicate phone calls, instant messages, emails, and/or any other type of communication.

The wireless mobile communication module 603 is configured to communicate wirelessly with a wireless mobile communication system. The wireless mobile communication system may include a cellular communication system and/or a data service that may include a gateway to the internet.

The automated reply system 605 may be the same as the automated reply system 101 illustrated in FIG. 1, except that the automated reply system 605 may be configured to only manage incoming communications for the wireless mobile communication device 601. Thus, all of the auto reply settings that are received by the communication module 103 may be solely for the wireless mobile communication device 601. These settings may be entered through the wireless mobile communication device 601, but with the authentication security provided by the security module 105. Thus, the user of the wireless mobile communication device 601, such as a teenager, may not be authorized to change any of the auto reply settings. Rather, the security module 105 may only accept changes requested by another person, such as the parent of the teenager. Again, the security module 105 may be configured to authenticate each person who attempts to make a change to a reply setting and not allow that change unless the person is authenticated as one who is authorized to make such a change.

In the configuration illustrated in FIG. 6, all of the functions discussed in FIG. 5 may be performed by the automated reply system 605, rather than divided between the automated reply system 101 and the communication system 303, as illustrated in FIG. 4. In the configuration illustrated in FIG. 6, deferral of delivery may be implemented by storing the incoming communication within a memory system within the wireless mobile communication device 601, without signaling its presence to the user of the wireless mobile communication device 601, until the wireless mobile communication device 601 is no longer moving faster than the threshold speed.

Portions of the functionality that have been described above in connection with the embodiment illustrated in FIG. 6 may instead be performed in a centralized system. For example, such a centralized system may be configured to store the content of incoming communication whose delivery has been deferred by the automated reply system 605.

Unless otherwise indicated, the auto reply system illustrated in FIG. 1, each of its modules, and the wireless mobile communication device that is illustrated in FIG. 4 are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or communication module devices (e.g., keyboards, pointing devices, displays, microphones, sound reproduction systems, and/or touch screens).

Each computer system for the automated reply system illustrated in FIG. 1 may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the auto reply module 111 may be configured to require the wireless mobile communication device to be moving at a threshold speed for a pre-determined period before initiating auto replies. Similarly, the cessation of movement may not cause the auto replies to cease until after the cessation lasts for a pre-determined period, e.g., one to two (or more) minutes or longer than that for a typical red light or generally stopped while stuck in a traffic jam. Each of these predetermined periods can be set in the auto reply settings and may be, for example, an amount of time that is entered or one of a number of selectable predetermined conditions (e.g., urban, rural, heavy or light traffic)—with each condition having a corresponding predetermined, usually different, period associated therewith.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. An automated reply system for automatically replying to incoming communications to wireless mobile communication devices while the wireless mobile communication devices are moving in conformance with one or more predetermined criteria, the automated reply system comprising:
   a communication module configured to receive auto reply settings for each of the wireless mobile communication devices, including for each wireless mobile communication device:
      an auto reply setting indicative of whether an automated reply should be sent in response to incoming communications to the wireless mobile communication device while the wireless mobile communication device is moving in conformance with the one or more predetermined criteria; and
      an auto reply exclusion setting identifying one or more sources whose incoming communications to the wireless mobile communication device should not receive the automated reply;
   an auto reply module configured to automatically provide a reply communication to each incoming communication to each of the wireless mobile communication devices for which an automated reply has been established, but not to incoming communications from the one or more sources when dictated by the auto reply exclusion setting, the reply communication only being provided while the wireless mobile communication device is moving in conformance with the one or more predetermined criteria; and
   a communication deferral module configured to defer the delivery of incoming communications for which an automated reply has been established, including those from the one or more sources, regardless of the auto reply exclusion setting, until the wireless mobile communication device to which the communications are sent is no longer moving in conformance with the one or more predetermined criteria, wherein:
      the auto replies designated to be sent by the auto reply settings are sent during the deferral of the incoming communications, and
      the predetermined criteria for initiating the automated reply includes when the wireless mobile communication device is moving in excess of a first predetermined speed and the predetermined criteria for ending the automated reply includes when the wireless mobile communication device is no longer moving in excess of a second predetermined speed that is lower than the first predetermined speed.

2. The automated reply system of claim 1 wherein:
   the auto reply settings for each wireless mobile communication device include a deferral setting indicating whether the delivery of incoming messages should be deferred while the wireless mobile communication device is moving in conformance with one or more predetermined criteria; and the communication deferral module is configured to defer the delivery of an incoming communication only when dictated by one of the deferral settings.

3. The automated reply system of claim 1 wherein the predetermined criteria for ending the automated reply includes when the wireless mobile communication device is no longer moving in excess of the second predetermined speed for a predetermined period of time.

4. The automated reply system of claim 1 wherein the communication module includes a web interface configured to receive the auto reply settings.

5. The automated reply system of claim 1 wherein the communication module is configured to allow the content of each reply communication that is automatically sent to be specified.

6. The automated reply system of claim 5 wherein the communication module is configured to allow the content to be specified by allowing the content to be selected from a list.

7. The automated reply system of claim 1 wherein the auto reply module is configured to receive incoming communications in the form of instant messages and to send replies in the form of instant messages.

8. The automated reply system of claim 1 wherein the auto reply module is configured to receive incoming communications in the form of phone calls and to send replies in the form of voice messages.

9. The automated reply system of claim 1 wherein the auto reply settings for each wireless mobile communication device include settings indicative of which types of communications should receive automated replies.

10. The automated reply system of claim 1 further comprising a security module configured to permit who can change the auto reply settings for each wireless mobile communication device to be restricted to a person that is not a primary user of the wireless mobile communication device.

11. The automated reply system of claim 10 wherein the security module is configured to permit who can change the deferral setting for each wireless mobile communication device to be restricted to the person that is not the primary user of the wireless mobile communication device.

12. The automated reply system of claim 10 wherein the security module is configured to permit who can change the exclusion settings for each wireless mobile communication device to be restricted to the person that is not the primary user of the wireless mobile communication device.

13. The automated reply system of claim 10 wherein the security module is configured to authenticate each person who is authorized to change the auto reply settings for each wireless mobile communication device before accepting any change to the auto reply setting from the person.

14. An automated reply system for automatically replying to incoming communications to a wireless mobile communication device while the wireless mobile communication device is moving in conformance with one or more predetermined criteria, the automated reply system comprising:
   a communication module configured to receive:
      one or more auto reply settings indicative of whether an automated reply should be sent in response to incoming communications to the wireless mobile communication device while the wireless mobile communication device is moving in conformance with the one or more predetermined criteria; and
      an auto reply exclusion setting identifying one or more sources whose incoming communications to the wireless mobile communication device should not receive the automated reply;
   an auto reply module configured to automatically provide a reply communication to each incoming communication to the wireless mobile communication device when an automated reply has been established, but not to incoming communications from the one or more sources when dictated by the auto reply exclusion setting, the reply communication only being provided while the wireless mobile communication device is moving in conformance with the one or more predetermined criteria; and
   a communication deferral module configured to defer the delivery of incoming communications for which an automated reply has been established, including those from the one or more sources, regardless of the auto reply exclusion setting, until the wireless mobile communication device is no longer moving in conformance with the one or more predetermined criteria, wherein:
   the auto replies designated to be sent by the auto reply settings are sent during the deferral of the incoming communications, and
   the predetermined criteria for initiating the automated reply includes when the wireless mobile communication device is moving in excess of a first predetermined speed and the predetermined criteria for ending the automated reply includes when the wireless mobile communication device is no longer moving in excess of a second predetermined speed that is lower than the first predetermined speed.

15. The automated reply system of claim 14 wherein the automated reply system is part of the wireless mobile communication device.

16. An automated reply system for automatically replying to incoming communications to a wireless mobile communication device while the wireless mobile communication device is moving in conformance with one or more predetermined criteria, the automated reply system comprising:
   a communication module configured to receive auto reply settings, including an auto reply setting indicative of whether an automated reply should be sent in response to incoming communications to the wireless mobile communication device while the wireless mobile communication device is moving in conformance with the one or more predetermined criteria;
   an auto reply module configured to automatically provide a reply communication to each incoming communication to the wireless mobile communication device for which an automatic reply been established, only while the wireless mobile communication device is moving in conformance with the one or more predetermined criteria,
   wherein the predetermined criteria for initiating the automated reply includes when the wireless mobile communication device is moving in excess of a first predetermined speed and the predetermined criteria for ending the automated reply includes when the wireless mobile communication device is no longer moving in excess of a second predetermined speed that is lower than the first predetermined speed.

17. The automated reply system of claim 16 further comprising a communication deferral module configured to defer the delivery of the incoming communications to which replies have automatically been provided, until the wireless mobile communication device to which the communications were sent is no longer moving in conformance with the one or more predetermined criteria.

18. The automated reply system of claim 16 wherein the communication module and the auto reply module are not part of any of the wireless mobile communication device.

\* \* \* \* \*